(12) United States Patent
Stumer

(10) Patent No.: US 7,460,548 B2
(45) Date of Patent: Dec. 2, 2008

(54) OPTIMALLY INTERWORKING SIP AND QSIG CALL DIVERSION AND TRANSFER

(75) Inventor: Peggy Marie Stumer, Boca Raton, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 620 days.

(21) Appl. No.: 11/109,102

(22) Filed: Apr. 19, 2005

(65) Prior Publication Data

US 2006/0233176 A1 Oct. 19, 2006

(51) Int. Cl.
*H04L 12/28* (2006.01)
(52) U.S. Cl. .................. 370/401; 370/468; 370/352; 455/455; 379/211.01
(58) Field of Classification Search .................. None
See application file for complete search history.

(56) References Cited

U.S. PATENT DOCUMENTS 6,072,866 A * 6/2000 Conan .................. 379/220.01
6,636,522 B1 * 10/2003 Perinpanathan et al. ..... 370/409
2004/0081160 A1 * 4/2004 Rousseau .................. 370/395.2
2006/0142010 A1 * 6/2006 Tom et al. .................. 455/445

* cited by examiner

*Primary Examiner*—Duc C Ho

(57) ABSTRACT

Under the present invention, resources such as gateways which interconnect usually disparate networks are released for processes which, while originally being inter-network, become intra-network, and the resource (e.g., gateway) is no longer needed for the intra-network process to be completed. The present invention is useful to optimally interwork an IP network with a PISN employing the QSIG Call Diversion and Single Step Call Transfer supplementary services. Attendant features achieved with implementation of the present invention, include quick release of network circuits that are being used for media connections that are no longer necessary and of system resources that are being used for signaling connections that are no longer necessary. Under the present invention, a media channel is not established from an IP network to a PISN, if a user of the PISN makes a call to a user of the IP network, who has forwarded/diverted her calls into the PISN and vice versa.

32 Claims, 12 Drawing Sheets

Corporate Network with an IP Network and a PISN

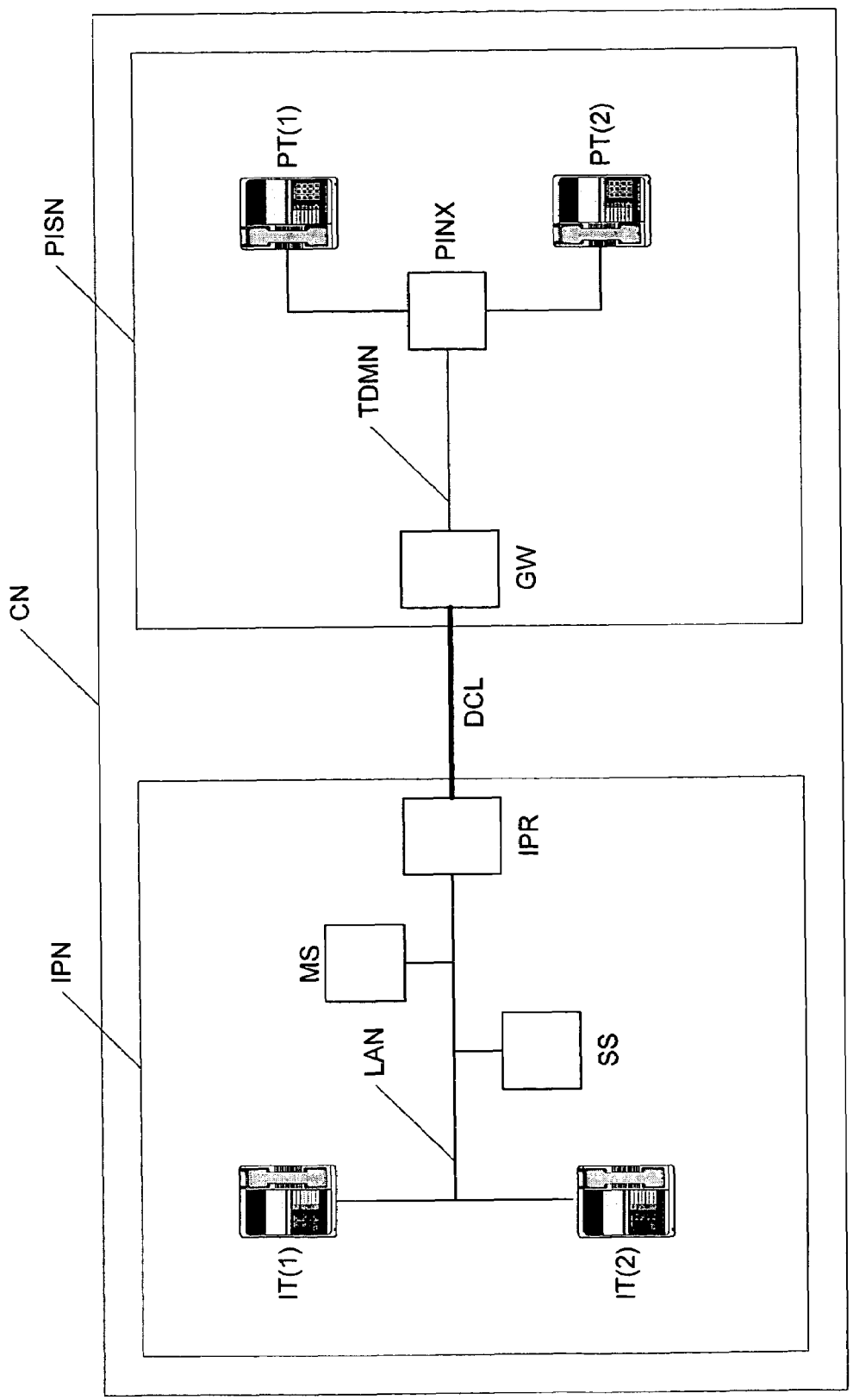
FIG. 1: Corporate Network with an IP Network and a PISN

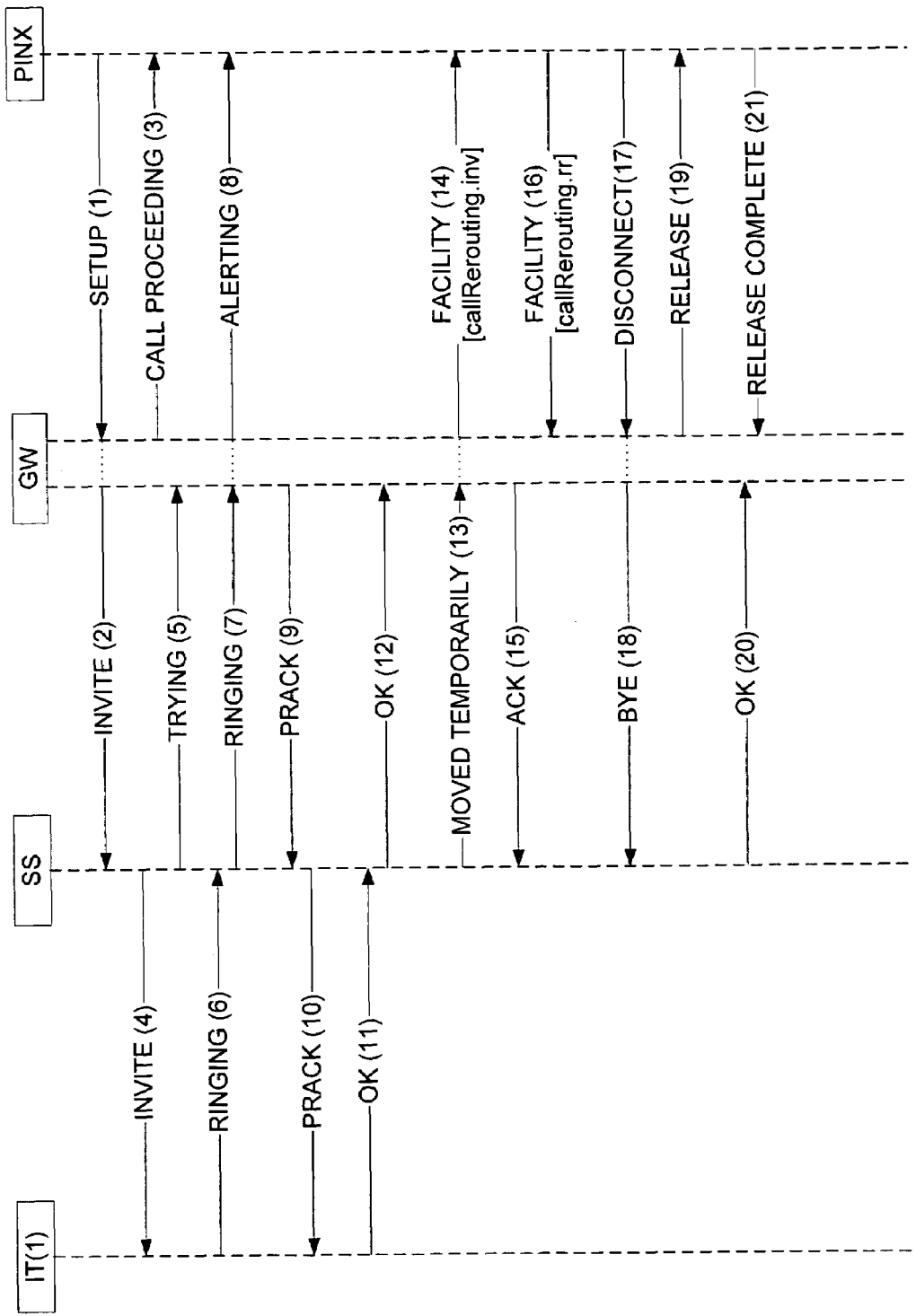
FIG. 2: Call Diversion from the IP Network to the PISN of FIG. 1

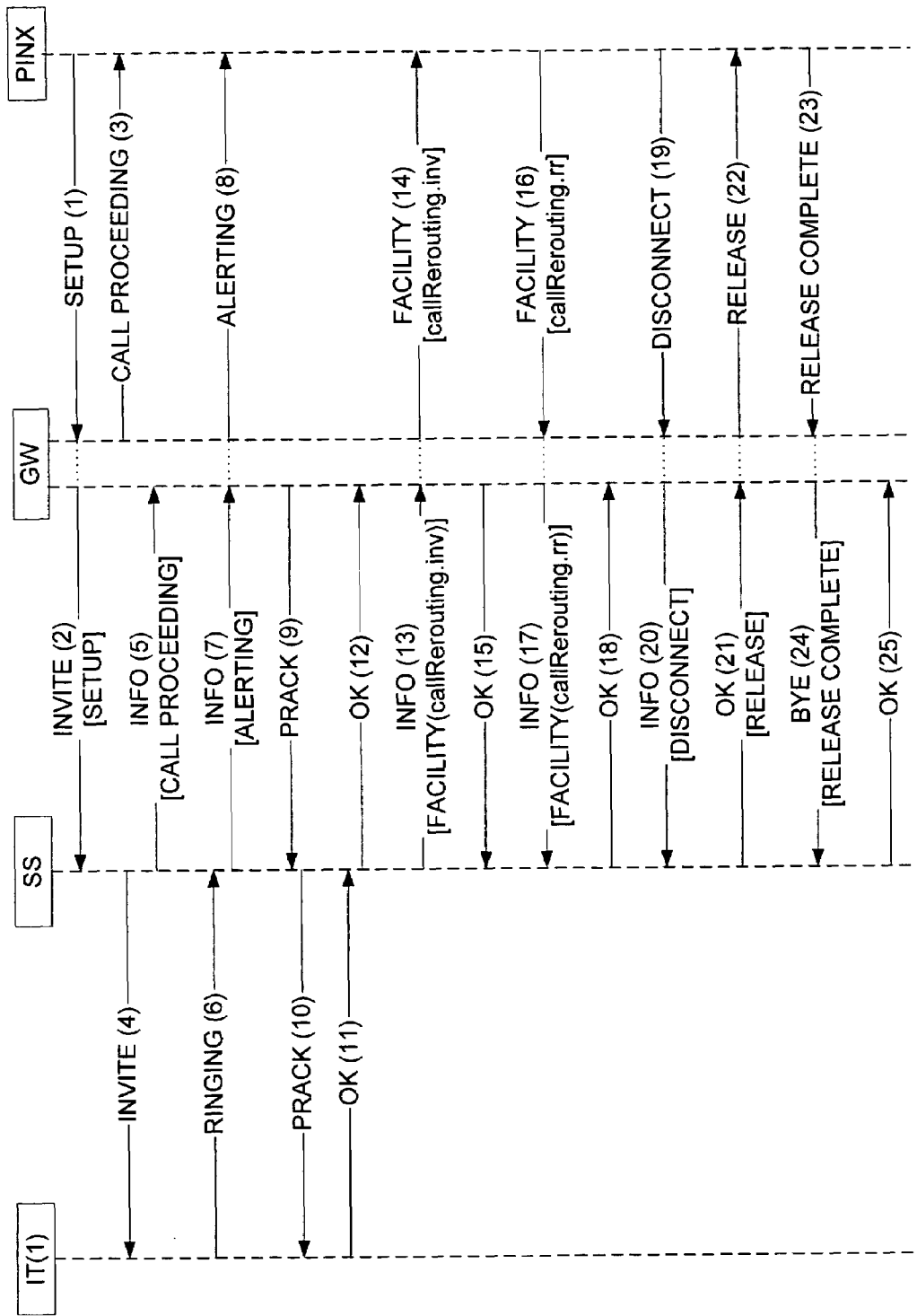
FIG. 3: Call Diversion from the IP Network to the PISN of FIG. 1 using SIP Tunneling

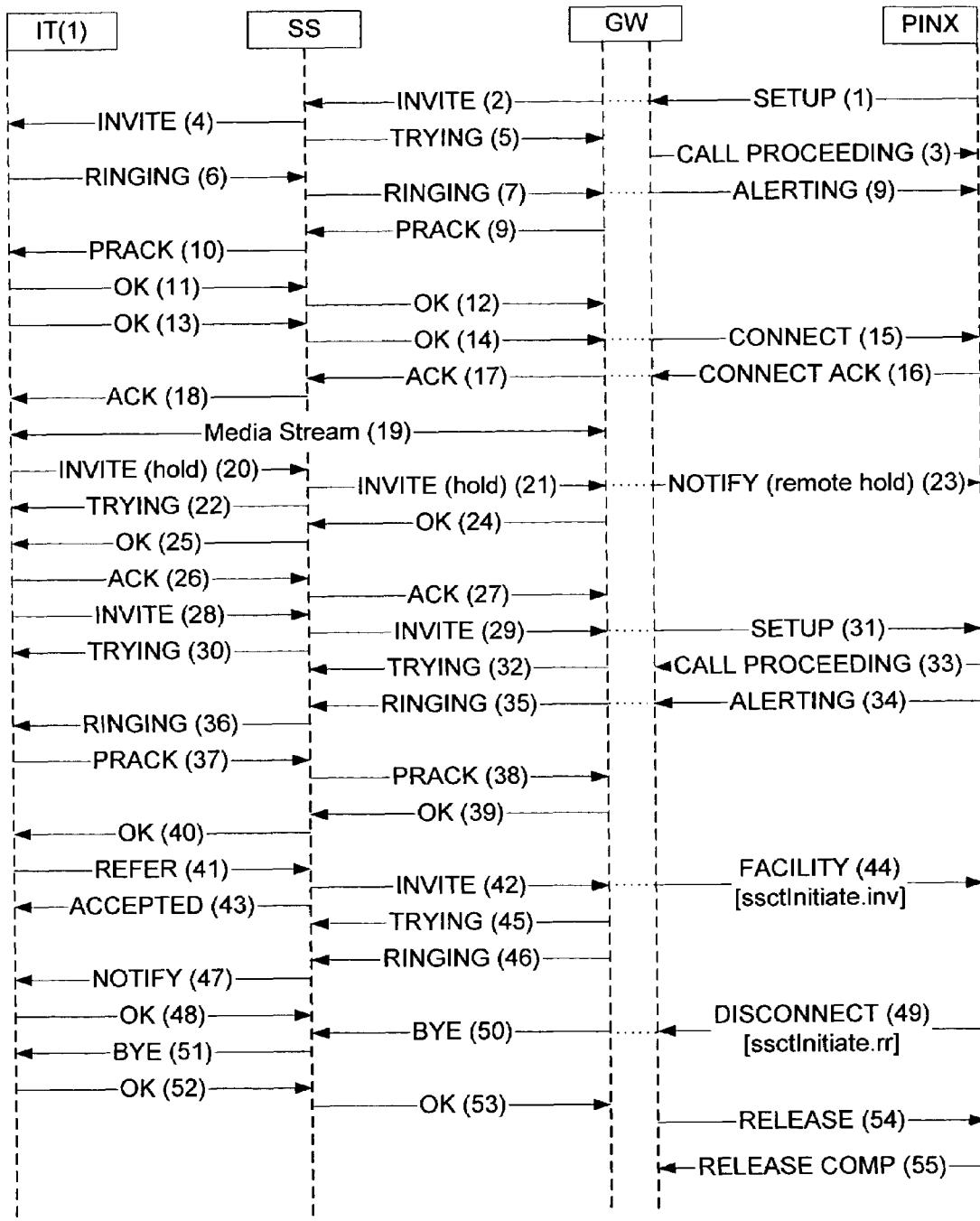
FIG. 4: Single Step Call Transfer from the SIP Network to the PISN of FIG. 1

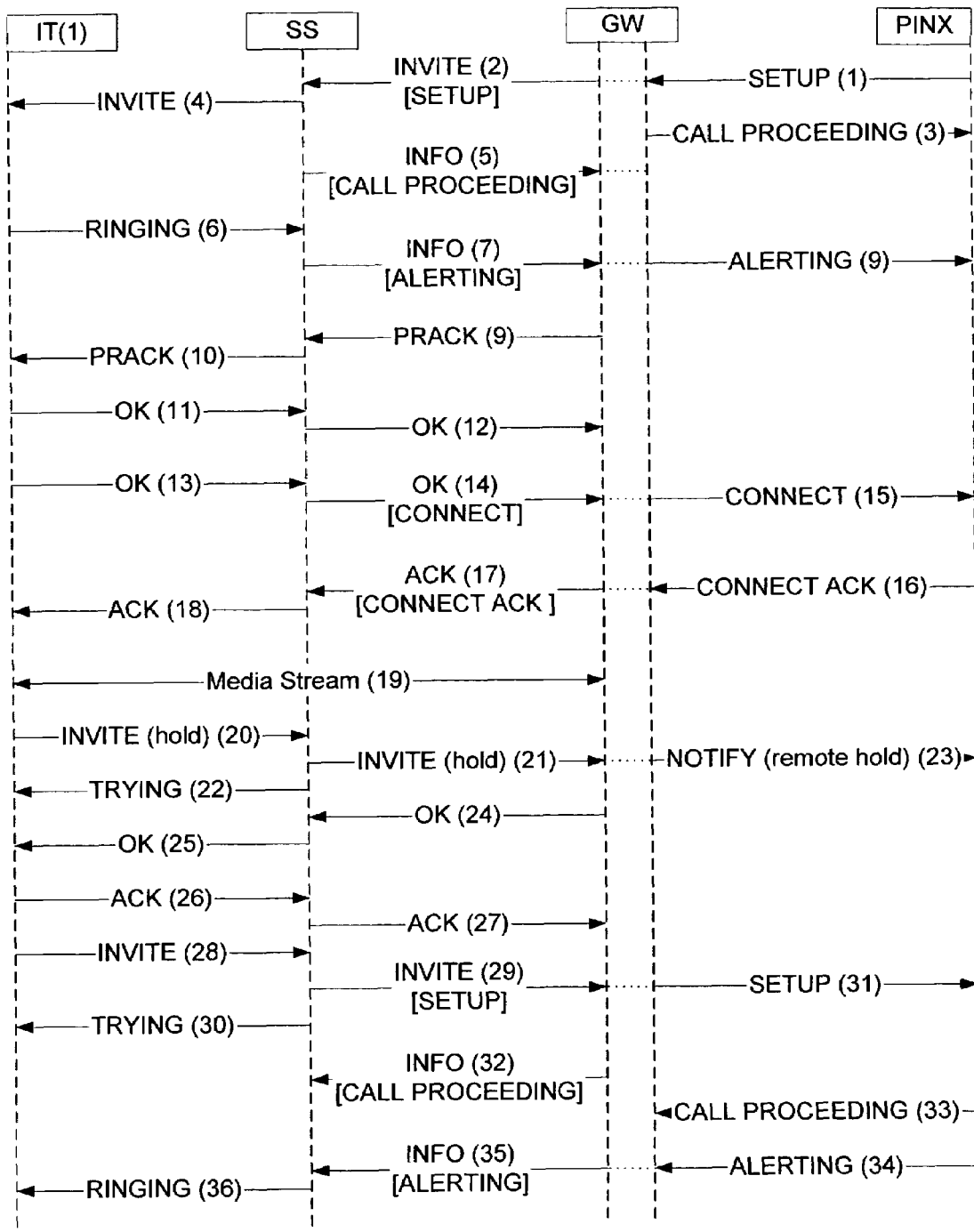
FIG. 5A: Single Step Call Transfer from the SIP Network to the PISN of FIG. 1 using SIP Tunneling

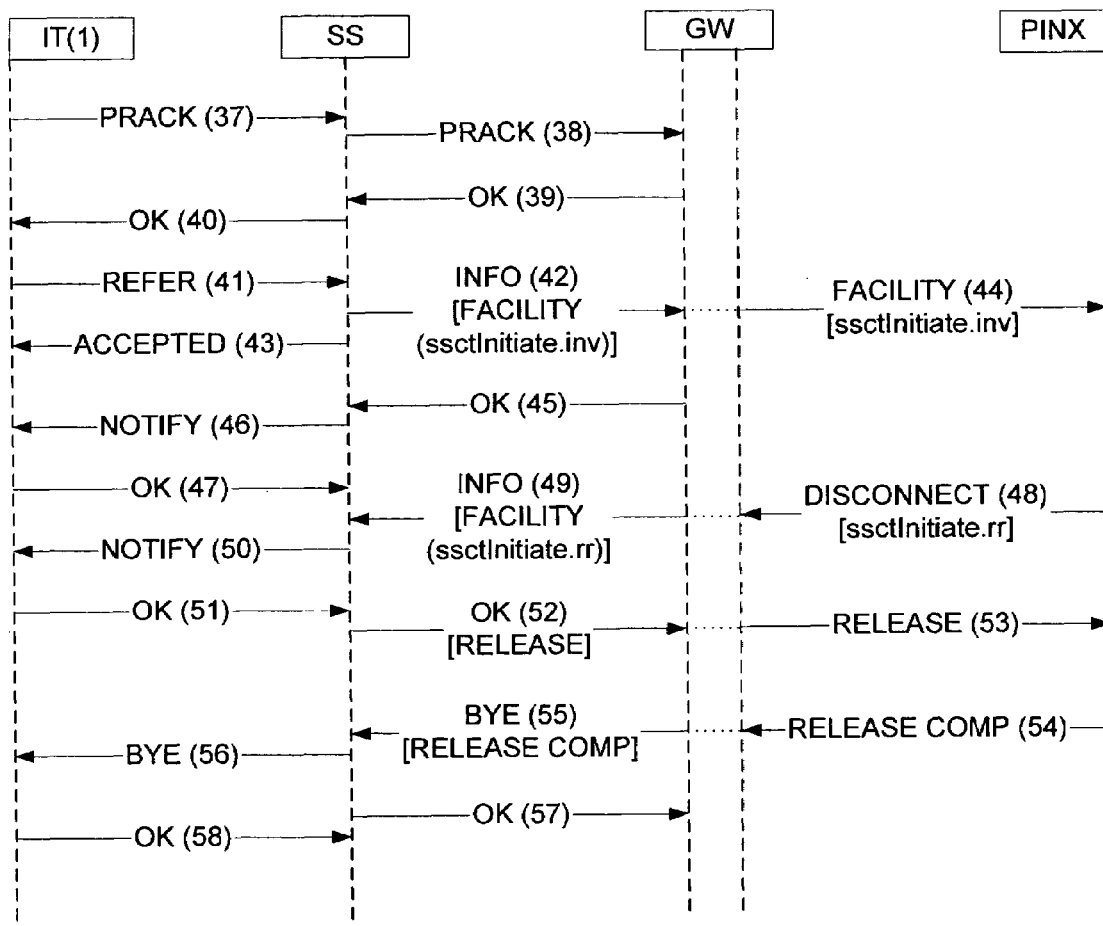
FIG. 5B: Single Step Call Transfer from the SIP Network to the PISN of FIG. 1 using SIP Tunneling

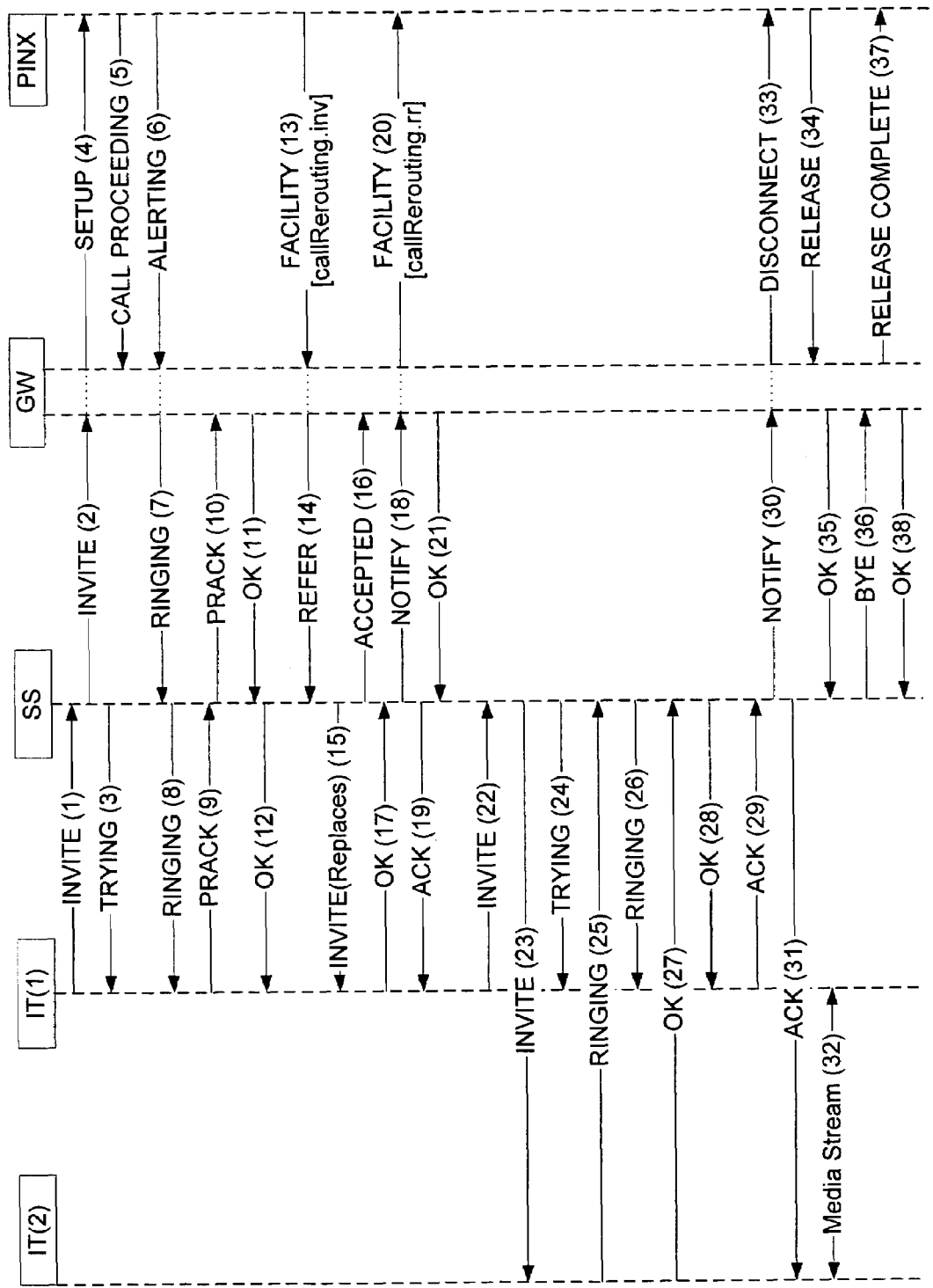
FIG. 6: Call Diversion from the PISN to the SIP Network of FIG. 1

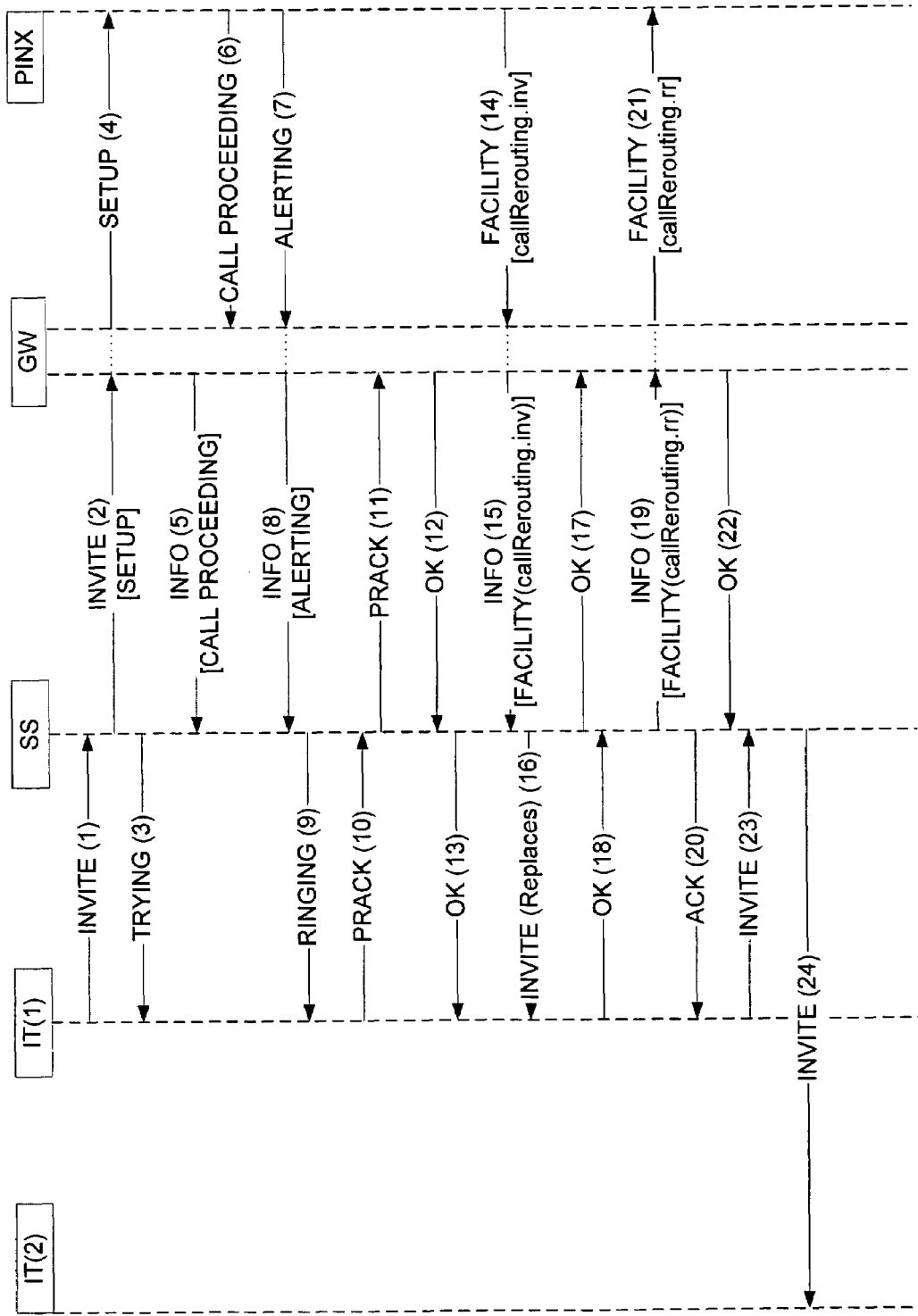
FIG. 7A: Call Diversion from the PISN to the SIP Network of FIG. 1 using SIP Tunneling

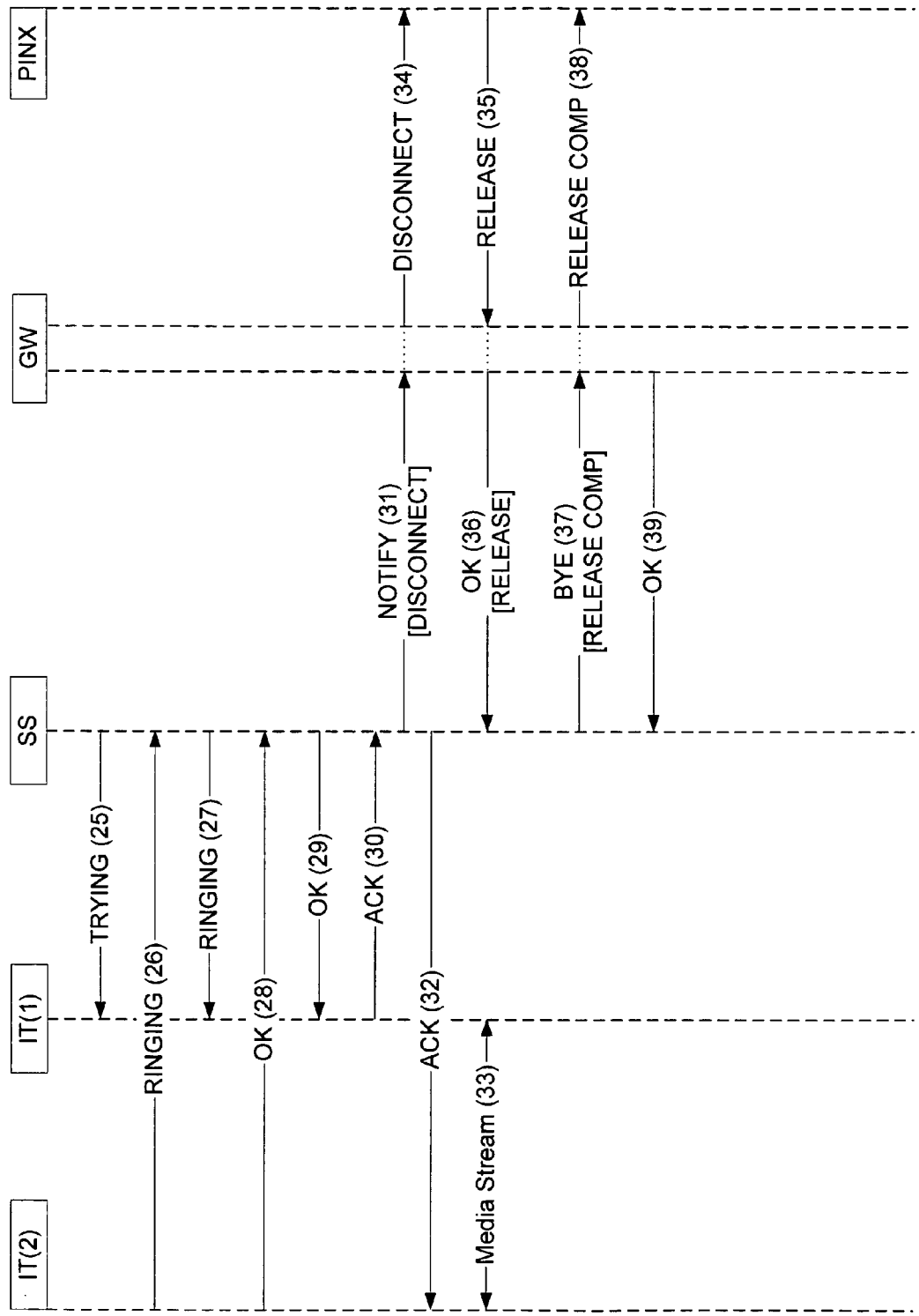
FIG. 7B Call Diversion from the PISN to the SIP Network of FIG. 1 using SIP Tunneling

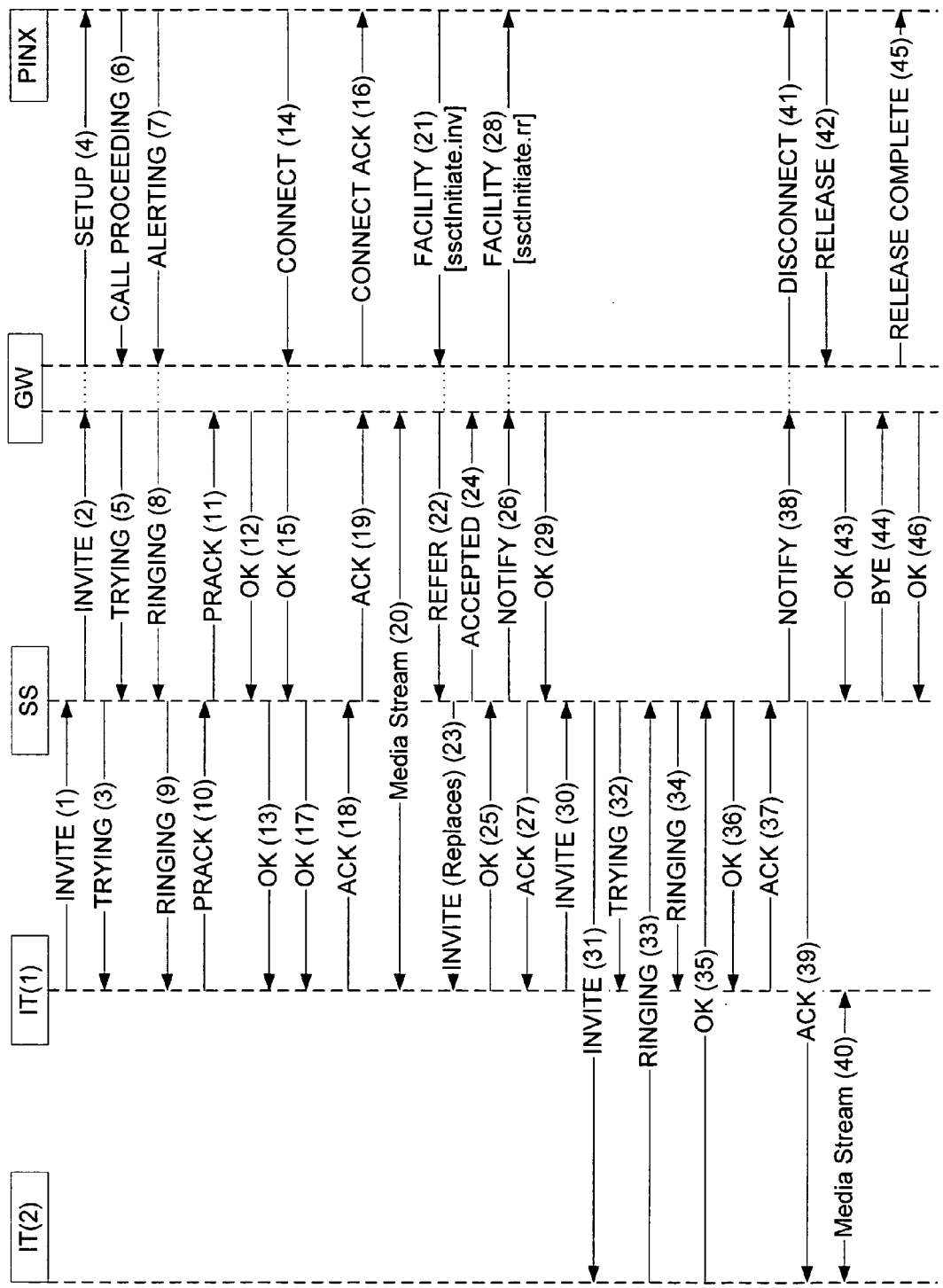
FIG. 8: Single Step Call Transfer from the PISN to the SIP Network of FIG. 1

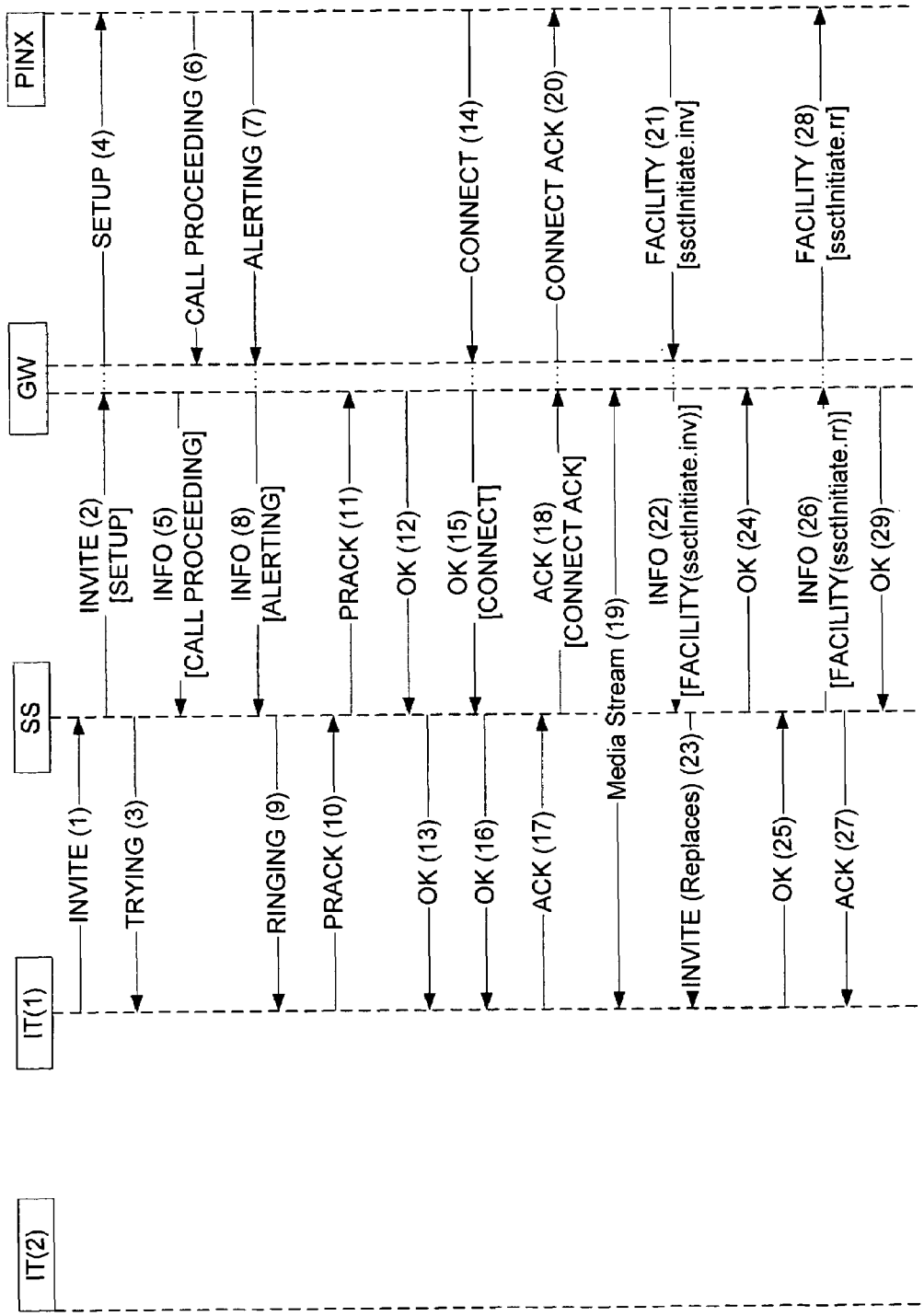
FIG. 9A: Single Step Call Transfer from the PISN to the SIP Network of FIG. 1 using SIP Tunneling

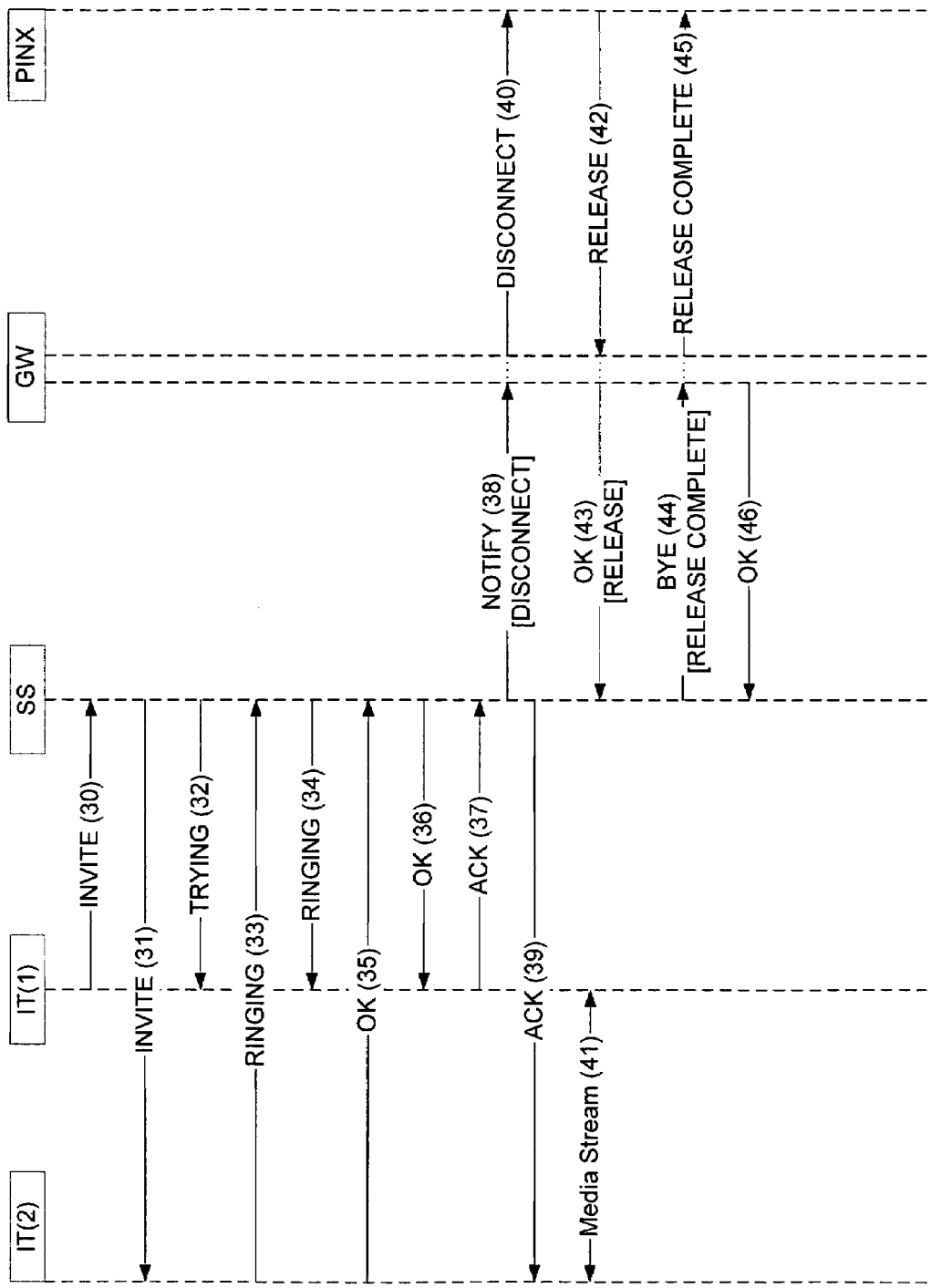
FIG. 9B: Single Step Call Transfer from the PISN to the SIP Network of FIG. 1 using SIP Tunneling

OPTIMALLY INTERWORKING SIP AND QSIG CALL DIVERSION AND TRANSFER

FIELD OF THE INVENTION

The present invention relates to communications networks, and, more particularly, to the provision of a resource management tool to optimally interwork cross-network functionality.

BACKGROUND OF THE INVENTION

In traditional corporate network architectures, each corporate location has separate networks for voice and data traffic. Circuit-switched, Time Division Multiplexing ("TDM") networks have been used for voice traffic and packet-switched networks have been used for data traffic. Typically, leased telephone lines have been used to interconnect the voice networks and data networks at each corporate location.

The Internet Protocol ("IP") and many other related protocols are maintained by the Internet Engineering Task Force ("IETF"). The IP is one of the most widely used protocols in packet-switched networks. IP networks are relatively inexpensive to deploy as most computer operating systems come with software that implements the IP. IP networks are also very reliable and have been adapted for many new applications. Consequently, IP networks have been used in many corporate network architectures for data networks. Devices known as routers employ the IP to route data packets among network segments. Typically, in corporate network architectures, leased telephone lines are used to interconnect gateway routers at each corporate location.

Corporate network architectures have similar configurations for interconnecting voice networks at each corporate location. Each corporate location typically has at least one Private Integrated Services Network Exchange ("PINX") that provides telephony services to users at that location. Leased telephone circuits are used to interconnect gateway PINXs at each corporate location. This arrangement allows telephone users at one corporate location to place telephone calls to users at other corporate locations, without incurring toll charges from public telephone network providers.

Corporations are continually striving to reduce operational costs that are associated with corporate network architectures. A recent trend has been to use corporate packet-switched IP networks to transport both voice and data traffic, so that only one network is required. These networks employ higher level protocols that work with the IP to support telephony applications. Examples of such higher level protocols include the Session Initiation Protocol ("SIP") and H.323 (which is a standard approved by the International Telecommunication Union (ITU) that defines how audiovisual conferencing data is transmitted across networks by defining protocols to provide audio-visual communication sessions on any packet network.)

Such different architectures implicate many diverse protocols.

So called Q Signaling ("QSIG") telecommunications standards have been developed in conjunction with the European Computer Manufacturers Association ("ECMA"). A parallel set of standards is maintained by the International Standards Organization ("ISO"). QSIG provides a standard means for establishing, terminating, and clearing voice calls in a Private Integrated Services Network ("PISN"). QSIG has been adopted by most PINX manufacturers to ensure interoperability among PINXs that are made by other manufacturers.

The QSIG protocols allow supplementary services to be provided to users of a PISN. Call Diversion and Single Step Call Transfer are examples of such supplementary services. Call Diversion involves retargeting a call during call establishment by changing a user identity that is used as the basis for routing the call to a destination. Call diversion has several variations, including Call Forwarding Busy ("CFB"), Call Forwarding No Reply ("CFNR"), Call Forwarding Unconditional ("CFU"), and Call Diversion ("CD"). Single Step Call Transfer supplementary services enable a user to transform two of that user's calls, at least one of which must be answered, into a new call between the two other users.

ECMA standards have been developed in support of QSIG supplementary services. A generic functional protocol for supporting supplementary services is defined in Standard ECMA-165. A Call Diversion supplementary service is specified in Standard ECMA-173 and Standard ECMA-174. A Call Transfer supplementary service is defined in Standard ECMA-177 and Standard ECMA-178. A Single Step Call Transfer supplementary service is specified in Standard ECMA-299 and Standard ECMA-300.

Interworking between QSIG and H.323 is defined in Standard ECMA-307. Interworking between QSIG and H.323 for Call Transfer supplementary services is specified in Standard ECMA-308. Interworking between QSIG and H.323 for Call Diversion supplementary services is defined in Standard ECMA-309. Interworking between QSIG and H.323 for Call Completion supplementary services is specified in Standard ECMA-326. Interworking between QSIG and H.323 for basic services is defined in Standard ECMA-332. Tunneling of QSIG through H.323 Networks is specified in Standard ECMA-333. Interworking between QSIG and SIP is defined in Standard ECMA-339. Tunneling of QSIG through SIP networks is specified in Standard ECMA-355.

The SIP is specified in Request For Comments ("RFC") 3261. An extension to the SIP for providing reliable provisional response messages is defined in RFC 3262. A privacy mechanism for the SIP is defined in RFC 3323. A Refer method for the SIP is specified in RFC 3515. A replaces header for the SIP is defined in RFC 3891. A referred-by mechanism for the SIP is defined in RFC 3892. The H.323 protocol suite was created by the International Telecommunications Union ("ITU"). A call control protocol in H.323 networks is defined in H.225. Security mechanisms for H.323 networks are defined in H.235. A media control protocol is specified in H.245. A generic functional protocol for supporting supplementary services in H.323 networks is defined in H.450.1. While the preceding examples are based on the SIP, it will be understood that the present invention also applies to H.323 networks.

However, despite trends toward integrated architectures as mentioned above, due to substantial investments that previously have been made in circuit-switched voice networks, separate voice and data networks will likely continue to be employed for years to come. Thus, there is a need to allow the coexistence of old infrastructure and new technology—i.e., to allow new IP networks to be connected to heritage QSIG networks.

To this end, gateway devices have been used to facilitate communications among networks that employ different communications protocols. For example, a QSIG/IP Gateway has two interfaces, one for an IP network and a separate interface for a QSIG TDM network. The gateway device performs protocol conversion functions, which allow telecommunications devices that reside in each network to communicate with one another. More particularly, the QSIG/IP Gateway is used to establish, modify, and terminate voice sessions between users of a QSIG PISN and IP network users.

Interworking between a QSIG network and an IP network permits calls originated in the QSIG network to be terminated in the IP network, and calls originating in the IP network to be terminated in the QSIG network. However, prior art gateways that perform QSIG/IP interworking have implemented non-optimal solutions that do not make efficient use of a QSIG/IP gateway's resources. For example, non-optimal QSIG/SIP interworking of the QSIG Call Diversion and Single Step Call Transfer supplementary services has resulted in connections being established through gateway PINXs that are not required. As a result, these prior art gateway PINXs are not utilized efficiently, which reduces the performance of these gateways.

SUMMARY OF THE INVENTION

The foregoing and other problems and deficiencies in the prior art are overcome by the present invention, which provides a method and communications network for optimally interworking an IP network with a PISN employing the QSIG Call Diversion and Single Step Call Transfer supplementary services.

One object of the present invention is to provide a method and apparatus of resource allocation in a communications structure which comprises at least a first network and a second network interconnected to each other through an inter-network resource, where an inter-network resource allocated to perform an inter-network process is released after the process becomes an intra-network process and prior to completion of the process.

An attendant object of the present invention is to quickly release circuits that are being used for media connections that are no longer necessary and/or avoid establishing media connections that are redirected.

A further object of the present invention is to quickly release system resources that are being used for signaling connections that are no longer necessary.

Yet another object of the present invention is to ensure that a media channel is not established from an IP network to a PISN, if a user of the PISN makes a call to a user of the IP network, who has forwarded/diverted her calls into the PISN.

Still another object of the present invention is to ensure that a media channel is not established from a PISN to an IP network, if a user of the IP network makes a call to a user of the PISN, who has forwarded/diverted her calls into the IP network.

A still further object of the present invention is to provide a generalized solution that is applicable to IP networks that employ the SIP or H. 323 protocols.

BRIEF DESCRIPTION OF THE DRAWINGS

The foregoing objects are achieved and other features and advantages of the present invention will become more apparent in light of the following detailed description of exemplary embodiments thereof, as illustrated in the accompanying drawings, where:

FIG. 1 depicts an illustrative corporate voice network according to the present invention, which consists of an IP Network and a PISN;

FIG. 2 depicts an illustrative exchange of QSIG and SIP messages that demonstrates a Call Diversion from the IP Network to the PISN of FIG. 1, according to one embodiment of the present invention;

FIG. 3 depicts an illustrative exchange of QSIG and SIP messages that demonstrates a Call Diversion from the IP Network to the PISN of FIG. 1, which employs SIP tunneling of QSIG messages, according to another embodiment of the present invention;

FIG. 4 depicts an illustrative exchange of QSIG and SIP messages that demonstrates a Single Step Call Transfer from the IP Network to the PISN of FIG. 1, according to another embodiment of the present invention;

FIG. 5A depicts an illustrative exchange of QSIG and SIP messages that demonstrates a Single Step Call Transfer from the IP Network to the PISN of FIG. 1, which employs SIP tunneling of QSIG messages, according to another embodiment of the present invention;

FIG. 5B is a continuation of the illustrative exchange of QSIG and SIP messages depicted in FIG. 5A;

FIG. 6 depicts an illustrative exchange of QSIG and SIP messages that demonstrates a Call Diversion from the PISN to the IP Network of FIG. 1, according to another embodiment of the present invention;

FIG. 7A depicts an illustrative exchange of QSIG and SIP messages that demonstrates a Call Diversion from the PISN to the IP Network of FIG. 1, which employs SIP tunneling of QSIG messages, according to another embodiment of the present invention;

FIG. 7B is a continuation of the illustrative exchange of QSIG and SIP messages depicted of FIG. 7A;

FIG. 8 depicts an illustrative exchange of QSIG and SIP messages that demonstrates a Single Step Call Transfer from the PISN to the IP Network of FIG. 1, according to another embodiment of the present invention;

FIG. 9A depicts an illustrative exchange of QSIG and SIP messages that demonstrates a Single Step Call Transfer from the PISN to the IP Network of FIG. 1, which employs SIP tunneling of QSIG messages, according to another embodiment of the present invention; and FIG. 9B is a continuation of the illustrative exchange of QSIG and SIP messages depicted in FIG. 9A.

DETAILED DESCRIPTION

By way of overview, the present invention improves network efficiency by optimizing resource usage through the management of communications network resources whereby inter-network resources are released from use when they are no longer required to complete a given task. Specifically, the present invention allows for an inter-network resource to be released when the nature of a process for which it was initially allocated/captured changes from being an inter-network process (i.e., the process is completed within a network different from that within which it originated) to being an intra-network process (i.e., the process is completed within the same network in which it originated), and the inter-network resource is no longer needed for the process to be completed. This is a departure from prior art systems where inter-network resources, after being captured to perform an inter-network operation, are not released until the process is completed, even though the process transforms into an intra-network operation and the inter-network resource is no longer required. Prior art systems thereby inefficiently and unnecessarily tie up valuable and limited network resources and can degrade overall network efficiency.

More specifically, as in one of the illustrative embodiments discussed in detail below where a communications network comprises two disparate networks such as an IP Network and a QSIG PISN interconnected by a gateway, the improvement offered by the present invention entails releasing the gateway for e.g., Call Diversion or Single Step Call Transfer, processes which, while originally being inter-network, e.g., a call initiated in the IP Network to a destination in the QSIG PISN network, become intra-network. In the prior art systems, the gateway is not released until the process is completed within the initiating IP network.

As the present invention, in alternative embodiments, may be implemented in environments involving one or more of the standards, protocols, networks and/or platforms, described in the background section above, each of those identified standards is herein incorporated by reference in its entirety.

Implementation of the present invention in various illustrative embodiments will now be described.

Referring now to FIG. 1, a Corporate Network CN according to an illustrative embodiment of the present invention is depicted, which is used to provide telephony services (not shown). The CN is comprised of an Internet Protocol Network IPN and a Private Integrated Services Network PISN, which are interconnected by a Dedicated Communications Link DCL. For example, each network is located in a different office of a large corporate enterprise and interconnected by a LAN/WAN.

The IPN in this embodiment is comprised of an IP Router IPR; a Local Area Network LAN; a Soft Switch SS of the present invention, which is a signaling gateway; a Media Server MS; a first Internet Telephone IT(1); and a second Internet Telephone IT(2). The IPR routes data packets between the LAN and the DCL. One skilled in the art will understand the IPN can be further comprised of other devices that are not depicted, which facilitate IP network communications. For example a Domain Name System ("DNS") server, a Dynamic Host Control Protocol ("DHCP") server, a Lightweight Directory Access Protocol ("LDAP") server, and other servers can also be connected to the IPN.

In the illustrative embodiment, the PISN is comprised of a Gateway GW configured according to the present invention; a Private Integrated Services Network Exchange PINX, which is a media and signaling gateway; a first PISN Telephone PT(1); and a second PISN Telephone PT(2). The Gateway GW and the Private Integrated Services Network Exchange PINX are interconnected by a Time Domain Multiplexing Network TDMN.

Illustrative message exchanges under the present invention are depicted in FIGS. 2-9, where a particular message is identified by its name and a number in parenthesis, which indicates a relative ordering of messages in the exemplary message exchanges that are depicted. The relative ordering of messages depicted in FIGS. 2-9 is exemplary and other relative orderings are possible as will be understood. On the PISN side, QSIG messages are exchanged between the Gateway GW and the Private Integrated Services Network Exchange PINX. On the IPN side, SIP or H.323 messages are exchanged between the Gateway GW and the Soft Switch SS. For example in FIG. 2, a QSIG SETUP (1) message is the first message exchanged and an SIP INVITE (2) message is the second message exchanged.

A first illustrative message exchange according to one embodiment of the present invention will be described now. Referring to FIG. 2, an exemplary QSIG and SIP message exchange demonstrating a Call Diversion from the IP Network IPN to the Private Integrated Services Network PISN of FIG. 1 is depicted.

In this example, before any message are exchanged, the Soft Switch SS has been provided with a telephone number associated with the PISN Telephone PT(2) and the Soft Switch SS has been directed to divert calls that are not answered within a specified period of time to the PISN Telephone PT(2). This is an example of Call Forward No Reply ("CFNR"), which is used throughout the Call Diversion examples that follow. However, one skilled in the art will understand that the method of QSIG/SIP interworking described supports other variants of the Call Diversion Supplementary Services defined in ECMA Standard ECMA-174; typically only the timing of the diversion is affected.

Initially, a call is made from the PISN Telephone PT(1) to the Internet Telephone IT(1). A QSIG SETUP (1) message contains, inter alia, a Calling Party Number information element and a Called Party Number information element, which contain telephone numbers for the PISN Telephone PT(1) and the Internet Telephone IT(1), respectively. The QSIG SETUP (1) message may also contain a Calling Party Subaddress and a Called Party Subaddress that further describes the network locations of the calling and called parties. The QSIG SETUP (1) message also contains information that describes the format in which media is to be supplied to the Private Integrated Services Network Exchange PINX.

The Gateway GW processes the QSIG SETUP (1) message and determines that the called party identified by the Called Party Number information element is located in the IP Network IPN. The Gateway GW uses the Called Party Number information element to generate an SIP Universal Resource Identifier ("URI") that corresponds to the Internet Telephone IT(1). The Gateway GW also identifies the Soft Switch SS as being responsible for routing requests on behalf of the Internet Telephone IT(1). The Gateway GW generates a Session Description Protocol ("SDP") message, which describes the manner in which media is to be provided from the Internet Telephone IT(1) to the Gateway GW. The Gateway generates an SIP INVITE (2) message, which includes an SIP URI for the Internet Telephone IT(1) in a Request-URI header field and includes the SDP message in the body of the SIP INVITE (2) message. The Gateway GW then sends the SIP INVITE (2) message to the Soft Switch SS.

The Gateway GW also sends a QSIG CALL PROCEEDING (3) message to the Private Integrated Services Network Exchange PINX to inform it of the status of the call. At this point, the call is utilizing one circuit in the Gateway GW. This circuit is used to connect a media stream (not shown) from the Private Integrated Services Network Exchange PINX with a media stream (not shown) from the Media Server MS, which provides ringback tones to the PISN Telephone PT(1).

The Soft Switch SS receives the SIP INVITE (2) message and uses it to generate an SIP INVITE (4) message, which is sent to the Internet Telephone IT(1). Since a call to Internet Telephone IT(1) is to be diverted to the PISN Telephone PT(2) if the call is not answered within a specified time, the Soft Switch SS also sets a call forwarding timer for this call. The Soft Switch SS sends the Gateway GW an SIP TRYING (5) message to inform the Gateway GW that it is attempting to complete the call. The Internet Telephone IT(1) responds by sending an SIP RINGING (6) message to the Soft Switch SS. The Soft Switch SS responds by sending an SIP RINGING (7) message to the Gateway GW. The Gateway GW sends a QSIG ALERTING (8) message to the Private Integrated Services Network Exchange PINX. SIP PRACK (9), SIP PRACK (10), SIP OK (11), and SIP OK (12) messages are sent to reliably acknowledge that the Gateway GW has received the SIP RINGING (7) message.

After the specified period of time has passed and the Internet Telephone IT(1) has not answered the call, the call forwarding timer on the Soft Switch SS expires and a Call Diversion operation is invoked. The Soft Switch SS examines the telephone number of the forwarded-to party, which in this example is the telephone number associated with the PISN Telephone PT(2), and determines that the call is being forwarded outside of the IP Network IPN to the same network from which the call originated. Upon making this determination, the Soft Switch SS begins an optimized QSIG/SIP interworked Call Diversion operation.

Under the present invention, the Soft Switch SS constructs an SIP MOVED TEMPORARILY (13) message that contains a Contact header field with a URI identifying the diverted-to party, in this case the PISN Telephone PT(2). The Soft Switch SS sends the SIP MOVED TEMPORARILY (13) message to the Gateway GW in response to the SIP INVITE (2) message. The Gateway GW processes the SIP MOVED TEMPORARILY (13) message and generates a QSIG FACILITY (14) message, which includes a QSIG callRerouting invocation (callRerouting.inv). The QSIG callRerouting invocation includes fields for the following parameters: reroutingReason, calledAddress, diversionCounter, pSS1InfoElement, lastReroutingNr, subscriptionOption, and callingNumber. The Gateway GW sends the QSIG FACILITY (14) message to the Private Integrated Services Network Exchange PINX. The Gateway GW also sends an SIP ACK (15) message to the Soft Switch SS to acknowledge receipt of the SIP MOVED TEMPORARILY (13) message.

The Private Integrated Services Network Exchange PINX responds with a QSIG FACILITY (16) message, which includes a QSIG callRerouting response (callRerouting.rr). The Private Integrated Services Network Exchange PINX has committed itself to rerouting the call from the PISN Telephone PT(1) to the PISN Telephone PT(2). Since a circuit for a connection through the Gateway GW is no longer required, a QSIG DISCONNECT (17) message is sent to the Gateway GW to release the gateway. The Gateway responds by sending an SIP BYE (18) message to the Soft Switch SS, which causes resources to be released that were devoted to signaling the original call from the PISN Telephone PT(1) in the IP Network IPN. The Soft Switch SS responds with an SIP OK (20) message. The Gateway GW also sends a QSIG RELEASE (19) message to the Private Integrated Services Network Exchange PINX, which responds by sending a QSIG RELEASE COMPLETE (21) message to the Gateway GW.

At this point, because of the rerouting function of the present invention, the Gateway GW is no longer involved in the call from the PISN Telephone PT(1) to the PISN Telephone PT(2), which connection is completed entirely by and through the Private Integrated Services Network Exchange PINX.

Prior art gateways, which do not perform the rerouting functions of the present invention, would unnecessarily remain in the connection path from the PISN Telephone PT(1) to the PISN Telephone PT(2), i.e., a path between two components entirely within the same network. For example, a prior art method of QSIG/SIP interworking is specified in the IETF Internet Draft entitled, "Interworking between SIP and QSIG" (January 2004). Using this prior art method of QSIG/SIP interworking, a "trombone" connection would be created. That is, a connection path from the PISN Telephone PT(1) to the PISN Telephone PT(2), after a call diversion from the IP Network IPN, would include a first connection from the Private Integrated Services Network Exchange PINX to the Gateway GW and a second connection from the Gateway GW back to the Private Integrated Services Network Exchange PINX.

Under the present invention, an optimized connection results which simply uses the Private Integrated Services Network Exchange PINX to connect the call from the PISN Telephone PT(1) to the PISN Telephone PT(2). The trombone connection resulting from the prior art QSIG/SIP interworking unnecessarily occupies network resources (i.e., two signaling paths and two media circuits) on prior art gateways. Thus, prior art QSIG/SIP interworking is not optimized to conserve finite, limited network resources.

A second illustrative message exchange according to another embodiment of the present invention will be described now. Referring now to FIG. 3, another QSIG and SIP message exchange is depicted demonstrating Call Diversion from the IP Network IPN to the Private Integrated Services Network PISN of FIG. 1, which employs SIP tunneling of QSIG messages. This example is similar to the previous example associated with FIG. 2, except a different QSIG/SIP interworking method is employed.

Initially, when the PISN Telephone PT(1) attempts to establish a call to the Internet Telephone IT(1), a QSIG SETUP (1) message is sent from the Private Integrated Services Network Exchange PINX to the Gateway GW. The Gateway GW responds by generating a QSIG SETUP message and encapsulating it in an SIP INVITE (2) message, which is sent to the Soft Switch SS. The Gateway GW also responds by generating a QSIG CALL PROCEEDING (3) message, which is sent to the Private Integrated Services Network Exchange PINX. In response to receiving the SIP INVITE (2) message, the Soft Switch SS generates a SIP INVITE (4) message that is sent to the Internet Telephone IT(1). The Soft Switch SS also generates a QSIG CALL PROCEEDING message, which is encapsulated in an SIP INFO (5) message and sent to the Gateway GW.

The Internet Telephone IT(1) responds to the SIP INVITE (4) message by sending an SIP RINGING (6) message to the Soft Switch SS, which responds by generating a QSIG ALERTING message and encapsulating it in an SIP INFO (7) message that is sent to the Gateway GW. The Gateway GW responds by sending a QSIG ALERTING (8) message to the Private Integrated Services Network PINX and by sending an SIP PRACK (9) message to the Soft Switch SS. The Soft Switch SS responds by sending an SIP PRACK (10) message to the Internet Telephone IT(1), which responds by sending a SIP OK (11) message to the Soft Switch SS. The Soft Switch SS responds by sending an SIP OK (12) message to the Gateway GW.

When the call forwarding timer expires in the Soft Switch SS, the Soft Switch SS determines that the call is being diverted to the same network on which it originated and begins a Call Diversion operation using another optimized QSIG/SIP interworking method of the present invention. The Soft Switch SS generates a QSIG FACILITY message that includes a QSIG callRerouting invocation, which is encapsulated in an SIP INFO (13) message and sent to the Gateway GW.

The Gateway processes the SIP INFO (13) message and generates a QSIG FACILITY (14) message, which includes the QSIG callRerouting invocation. The QSIG FACILITY (14) message is sent to the Private Integrated Services Network Exchange PINX. The Gateway GW also sends an SIP OK (15) message to the Soft Switch SS to acknowledge receipt of the SIP INFO (13) message.

The Private Integrated Services Network Exchange PINX agrees to route the call and responds to the Gateway GW by sending it a QSIG FACILITY (16) message, which includes a QSIG callRerouting response. The Gateway GW processes the QSIG FACILITY (16) message and prepares another QSIG FACILITY message with the callRerouting response, which is encapsulated in an SIP INFO (17) message and sent to the Soft Switch SS. The Soft Switch SS responds by sending an SIP OK (18) message to the Gateway GW.

Using this method of QSIG/SIP interworking, the Gateway GW is no longer required to be in the connection path for the call from the PISN Telephone PT(1) to the PISN Telephone PT(2). Thus, the Private Integrated Services Network Exchange PINX sends a QSIG DISCONNECT (19) message to the Gateway GW. The Gateway GW responds by generating a QSIG DISCONNECT message that is encapsulated in a SIP INFO (20) message and sent to the Soft Switch SS. The Soft Switch SS responds by generating a QSIG RELEASE message, which is encapsulated in an SIP OK (21) message and send to the Gateway GW. The Gateway GW responds by generating a QSIG RELEASE (22) message that is sent to the Private Integrated Services Network Exchange PINX, which responds by sending a QSIG RELEASE COMPLETE (23) message to the Gateway GW. The Gateway GW responds by generating a QSIG RELEASE COMPLETE, which is encapsulated in an SIP BYE (24) message and send to the Soft Switch SS, which responds by sending an SIP OK (25) message to the Gateway GW.

A third illustrative message exchange according to another embodiment of the present invention will be described now. Referring now to FIG. 4, a QSIG and SIP message exchange is depicted demonstrating a Single Step Call Transfer from the IP Network IPN to the Private Integrated Services Network PISN of FIG. 1. In this example, a call is placed from the PISN Telephone PT(1) that is answered at the Internet Telephone IT(1), where the call is placed on hold and transferred to the PISN Telephone PT(2). The QSIG SETUP (1) through SIP OK (12) messages are as described in the description of the first exemplary message exchange.

When the call is answered at the Internet Telephone IT(1), an SIP OK (13) message is sent to the Soft Switch SS, which sends an SIP OK (14) message to the Gateway GW. The Gateway GW responds by sending a QSIG CONNECT (15) message to the Private Integrated Services Network PINX, which responds with a QSIG CONNECT ACK (16) message. The Gateway GW also responds to the QSIG CONNECT (15) message by sending an SIP ACK (17) message to the Soft Switch SS, which responds by sending an SIP ACK (18) message to the Internet Telephone IT(1). The Gateway GW then connects a resulting Media Stream (19) between the Internet Telephone IT(1) and the Gateway GW to a circuit (not shown) that is connected to the Private Integrated Services Network PINX.

The Internet Telephone IT(1) places the call on hold by sending an SIP INVITE (20) message, which indicates that the call is being put on hold, to the Soft Switch SS. The Soft Switch SS responds by sending a similar SIP INVITE (21) message to the Gateway GW and an SIP TRYING (22) message to the Internet Telephone IT(1). The Gateway GW responds by sending a QSIG NOTIFY (23) message that contains a Notification information element, which indicates that a remote hold has been initiated, to the Private Integrated Services Network Exchange PINX. In response, the Private Integrated Services Network Exchange PINX provides a ringing tone (not shown) to PISN Telephone PT(1), which indicates that the call is being transferred. The Gateway GW also responds by sending an SIP OK (24) message to the Soft Switch SS, which sends an SIP OK (25) message to the Internet Telephone IT(1). The Internet Telephone IT(1) responds by sending an SIP ACK (26) message to the Soft Switch SS, which sends an SIP ACK (27) message to the Gateway GW. The Media Stream (19) between the Internet Telephone IT(1) and the Gateway GW is now terminated.

The Internet Telephone IT(1) initiates a call to PISN Telephone PT(2) by sending an SIP INVITE (28) message, resulting in an exchange of messages from SIP INVITE (29) through SIP OK (40) messages. The call has now been established from the Internet Telephone IT(1) to the PISN Telephone PT(2). The Internet Telephone IT(1) proceeds to transfer the call from the PISN Telephone PT(1) to the PISN Telephone PT(2) by sending an SIP REFER (41) message to the Soft Switch SS. The Soft Switch SS processes the SIP REFER (41) message and determines that the URI specified in the Refer-To header field of the REFER (41) message is for a destination that is outside the IP Network IPN and sends an SIP INVITE (42) message to the Gateway GW. The Soft Switch SS also sends an SIP ACCEPTED (43) message to the Internet Telephone IT(1).

The Gateway GW responds to the SIP INVITE (42) message by sending a QSIG FACILITY (44) message, which includes an ssctInitiate invocation, to the Private Integrated Services Network Exchange PINX. This message requests that the Private Integrated Services Network Exchange PINX connect the call from the PISN Telephone PT(1) to the PISN Telephone PT(2). The Gateway GW also responds by sending an SIP TRYING (45) and an SIP RINGING (46) messages to the Soft Switch SS. The Soft Switch SS responds by sending an SIP NOTIFY (47) message to the Internet Telephone IT(1), which responds by sending an SIP OK (48) message.

The Private Integrated Services Network Exchange PINX agrees to route the transferred call between the PISN Telephone PT(1) and the PISN Telephone PT(2), it sends a QSIG DISCONNECT (49) message, which includes a ssctInitiate response to the Gateway GW. The Gateway GW responds by sending an SIP BYE (50) message to the Soft Switch SS, which responds by sending an SIP BYE (51) message to the Internet Telephone IT(1). The Internet Telephone IT(1) responds by sending an SIP OK (52) message to the Soft Switch SS, which responds by sending an SIP OK (53) message to the Gateway GW. The Gateway GW responds by sending a QSIG RELEASE (54) message to the Private Integrated Services Network Exchange PINX, which replies with a QSIG RELEASE COMPLETE (55) message. The call from the PISN Telephone PT(1) to the PISN Telephone PT(2) is now connected by the Private Integrated Services Network Exchange PINX and no resources for this call are consumed in the Gateway GW or the Soft Switch SS.

Referring now to FIGS. 5A, and 5B, a fourth illustrative message exchange according to another embodiment of the present invention will be described now where a QSIG and SIP message exchange is depicted, which demonstrates a Single Step Call Transfer from the IP Network IPN to the Private Integrated Services Network PISN of FIG. 1 using another method of the present invention that employs SIP tunneling of QSIG messages. In this example, a call is placed from the PISN Telephone PT(1) that is answered by Internet Telephone IT(1), the call is placed on hold and transferred to the PISN Telephone PT(2). The QSIG SETUP (1) through SIP OK (12) messages are as described in the discussion of the second exemplary message exchange.

When the Internet Telephone IT(1) is answered, an SIP OK (13) message is sent to the Soft Switch SS, which processes the message and generates a QSIG CONNECT message, which is encapsulated in an SIP OK (14) message and sent to the Gateway GW. The Gateway GW responds by sending a QSIG CONNECT (15) message to the Private Integrated Services Network Exchange PINX, which responds by sending a QSIG CONNECT ACK (16) message to the Gateway GW. The Gateway GW processes this message and generates a QSIG CONNECT ACK message, which is encapsulated in an SIP ACK (17) message and sent to the Soft Switch SS. The Soft Switch SS processes the message and responds by sending an SIP ACK (18) message to the Internet Telephone IT(1), which results in the establishment of a Media Stream (19).

A Single Step Call Transfer operation is initiated at the Internet Telephone IT(1) resulting in an SIP INVITE (20)

message, which indicates that the call is to be placed on hold, being generated and sent to the Soft Switch SS. The Soft Switch SS responds by sending a similar SIP INVITE (21) message to the Gateway GW and a SIP TRYING (22) message to Internet Telephone IT(1). Gateway GW responds by generating a QSIG NOTIFY (23) message, which includes a Notification information element that indicates that a remote hold has been initiated, and sending it to the Private Integrated Services Network Exchange PINX. The Gateway GW also responds by sending an SIP OK (24) message to the Soft Switch SS, which responds by sending an SIP OK (25) message to the Internet Telephone IT(1). The Internet Telephone IT(1) responds by sending an SIP ACK (26) message to the Soft Switch SS, which responds by sending an SIP ACK (27) message to the Gateway GW.

The Internet Telephone IT(1) places a call to the PISN Telephone PT(2) by sending an SIP INVITE (28) message to the Soft Switch SS, which responds by generating a QSIG SETUP message and encapsulating it in an SIP INVITE (29) message, which is sent to the Gateway G-W, and by sending a SIP TRYING (30) message to the Internet Telephone IT(1). The Gateway GW responds by generating a QSIG SETUP (31) message, which is sent to the Private Integrated Services Network Exchange PINX. The Gateway GW also responds by generating a QSIG CALL PROCEEDING (33) message, which is encapsulated in an SIP INFO (32) message and sent to the Soft Switch SS.

The Private Integrated Services Network Exchange PINX signals that the PISN Telephone PT(2) is ringing by sending a QSIG ALERTING (34) message to the Gateway GW, which responds by generating a similar QSIG ALERTING message and encapsulating it in an SIP INFO (35) message that is sent to the Soft Switch SS. The Soft Switch SS processes the message and responds by sending an SIP RINGING (36) message to the Internet Telephone IT(1), which responds by sending an SIP PRACK (37) message to the Soft Switch SS, which responds by sending an SIP PRACK (38) message to the Gateway GW. The Gateway GW responds by sending an SIP OK (39) message to the Soft Switch SS, which responds by sending an SIP OK (40) message to the Internet Telephone IT(1). The Internet Telephone IT(1) proceeds to transfer the call to the PISN Telephone PT(2) by generating an SIP REFER (41) message, which is sent to the Soft Switch SS.

The Soft Switch SS processes the SIP REFER (41) message and determines that the URI specified in the Refer-To header field is for a destination that is outside the IP Network IPN, thus the Soft Switch SS generates a QSIG FACILITY message that contains an ssctInitiate invocation, which is encapsulated in an SIP INFO (42) message and sent to the Gateway GW. The Soft Switch SS also sends an SIP ACCEPTED (43) message to the Internet Telephone IT(1). The Gateway GW creates a QSIG FACILITY (44) message, which includes the ssctInitiate invocation, that is sent to the Private Integrated Services Network Exchange PINX. The Gateway GW also sends an SIP OK (45) message to the Soft Switch SS, which responds by generating and sending an SIP NOTIFY (46) message to the Internet Telephone IT(1), which replies with an SIP OK (47) message.

Private Integrated Services Network Exchange PINX agrees to route the transferred call between the PISN Telephone PT(1) and the PISN Telephone PT(2) and sends a QSIG DISCONNECT (48) message, which includes an ssctInitiate response, to the Gateway GW. The Gateway GW responds by sending an SIP INFO (49) message, which contains an encapsulated QSIG FACILITY message that includes the ssctInitiate response, to the Soft Switch SS. The Soft Switch SS responds by generating and sending an SIP NOTIFY (50) message to the Internet Telephone IT(1), which responds by sending an SIP OK (51) message to the Soft Switch SS. The Soft Switch SS processes the SIP OK (51) message, generates a QSIG RELEASE message, and encapsulates it in an SIP OK (52) message, which is sent to the Gateway GW. The Gateway GW responds by sending a QSIG RELEASE (53) message to the Private Integrated Services Network Exchange PINX, which replies with a QSIG RELEASE COMPLETE (54) message.

The Gateway GW responds to the QSIG RELEASE COMPLETE (54) message by generating a QSIG RELEASE message, which is encapsulated in an SIP BYE (55) message, and sending it to the Soft Switch SS. The Soft Switch SS processes the SIP BYE (55) message and generates an SIP BYE (56) message that is sent to the Internet Telephone IT(1), which replies with an SIP OK (58) message. The Soft Switch SS also responds to the SIP BYE (55) message by sending an SIP OK (57) message to the Gateway GW.

An illustrative message exchange according to another embodiment of the present invention is shown in FIG. 6 where a QSIG and SIP message exchange is depicted demonstrating a Call Diversion from the Private Integrated Services Network PISN to the IP Network IPN of FIG. 1. In this example, before any message are exchanged, the Private Integrated Network Exchange PINX has been provided with a telephone number associated with the Internet Telephone IT(2) and has been directed to divert calls that are not answered by PISN Telephone PT(1) within a specified period of time to the Internet Telephone IT(2).

Initially a call is placed from Internet Telephone IT(1) to the PISN Telephone PT(1), resulting in the depicted message exchange from SIP INVITE (1) through SIP OK (12). When the call is diverted by the Private Integrated Services Network Exchange PINX, a QSIG FACILITY (13), which contains a callRerouting invocation, is sent to the Gateway GW. The Gateway GW responds by sending an SIP REFER (14) message, which includes a Refer-To header field with a URI that identifies the Internet Telephone IT(2), to the Soft Switch SS. The Soft Switch SS processes the SIP REFER (14) message and constructs an SIP INVITE (15) message, which includes a Replaces header indicating that the SIP dialog that was initiated with the SIP INVITE (1) message is to be shut down and replaced with a new dialog associated with the SIP INVITE (15) message.

The SIP INVITE (15) message is sent from the Soft Switch SS to the Internet Telephone IT(1). The Soft Switch SS also sends an SIP ACCEPTED (16) message to the Gateway GW. The Internet Telephone IT(1) replies to the SIP INVITE (15) message with an SIP OK (17) message. The Soft Switch SS sends an SIP NOTIFY (18) message to the Gateway GW, which replies with an SIP OK (21) message. The Gateway GW also sends a QSIG FACILITY (20) message, which includes a callRetourting response, to the Private Integrated Services Network Exchange PINX.

The Internet Telephone IT(1) then places a new call to the Internet Telephone IT(2), resulting in the depicted message exchange from SIP INVITE (22) to SIP ACK (29). The Soft Switch SS processes the SIP ACK (29) and generates an SIP NOTIFY (30) message, which is sent to the Gateway GW. The Soft Switch SS also responds by sending an SIP ACK (31) message to the Internet Telephone IT(2), which results in a Media Stream (32) between the Internet Telephone IT(1) and the Internet Telephone IT(2).

The Gateway GW processes the SIP NOTIFY (30) message and generates a QSIG DISCONNECT (33) message, which is sent to the Private Integrated Network Exchange PINX. The Private Integrated Network Exchange PINX responds to the QSIG DISCONNECT (33) message by sending a QSIG RELEASE (34) message to the Gateway GW, which responds by sending an SIP OK (35) message to the Soft Switch SS, which replies with an SIP BYE (36) message. The Gateway GW responds to the SIP BYE (36) message by sending a QSIG RELEASE COMPLETE (37) message to the Private Integrated Network Exchange PINX and by sending an SIP OK (38) message to the Soft Switch SS.

A sixth exemplary message exchange according to another embodiment of the present invention will be described now. Referring now to FIGS. 1, 7A, and 7B, an exemplary QSIG and SIP message exchange is depicted demonstrating a Call Diversion from the Private Integrated Services Network PISN to the IP Network IPN of FIG. 1, which uses SIP tunneling of QSIG messages. In this example, before any messages are exchanged, the Private Integrated Network Exchange PINX has been provided with a telephone number associated with the Internet Telephone IT(2) and has been directed to divert calls that are not answered by the PISN Telephone PT(1) within a specified period of time to the Internet Telephone IT(2).

The SIP INVITE (1) through the SIP OK (13) messages result from Internet Telephone IT(1) placing a call to the PISN Telephone PT(1). A QSIG FACILITY (14) message, which includes a callRerouting invocation, is sent from the Private Integrated Services Network Exchange PINX to the Gateway GW to divert the call from the Internet Telephone IT(1) to the Internet Telephone IT(2). Upon receipt of the QSIG FACILITY (14) message, the Gateway GW creates an SIP INFO (15) message, which contains an encapsulated QSIG FACILITY message with the callRerouting invocation. The SIP INFO (15) message is sent to the Soft Switch SS, which processes the message and uses the information contained in the callRerouting invocation to generate a URI that identifies the Internet Telephone IT(2), which is added to a Replaces header that is sent with an SIP INVITE (16) message to the Internet Telephone IT(1). The Soft Switch also acknowledges receipt of the SIP INFO (15) message by sending an SIP OK (17) message to the Gateway GW.

The Internet Telephone IT(1) responds to the SIP INVITE (16) message by sending an SIP OK (18) message to the Soft Switch SS, which responds by generating an SIP INFO (19) message, which includes a QSIG callRerouting response, and sending it to the Gateway GW. The Gateway GW processes the SIP INFO (19) message and generates a QSIG FACILITY (21) message, which contains the QSIG callRerouting response, and sends it to the Private Integrated Services Network Exchange PINX. The Gateway GW also sends an SIP OK (22) message to the Soft Switch SS, in response to receiving the SIP INFO (19) message.

The Soft Switch SS also responds to the SIP OK (18) message by sending an SIP ACK (20) message to the Internet Telephone IT(1), which responds by sending an SIP INVITE (23) message to the Soft Switch SS. The Soft Switch SS responds by sending an SIP INVITE (24) message to the Internet Telephone IT(2) and by sending an SIP TRYING (25) message to the Internet Telephone IT(1). The Internet Telephone IT(2) responds to the SIP INVITE (24) message by sending an SIP RINGING (26) message to the Soft Switch SS, which responds by sending an SIP RINGING (27) message to the Internet Telephone IT(1). When the Internet Telephone IT(2) is answered, an SIP OK (28) message is sent to the Soft Switch SS, which responds by sending an SIP OK (29) message to the Internet Telephone IT(1). The Internet Telephone IT(1) responds to the SIP OK (29) message by sending an SIP ACK (30) message to the Soft Switch SS.

The Soft Switch SS processes the SIP ACK (30) message and generates a QSIG DISCONNECT message, encapsulates it in an SIP NOTIFY (31) message, and sends it to the Gateway GW. The Soft Switch SS also responds by sending an SIP ACK (32) message to the Internet Telephone IT(2), which results in a Media Stream (33) between the Internet Telephone IT(1) and the Internet Telephone IT(2). The Gateway GW responds to the SIP NOTIFY (31) message by sending a QSIG DISCONNECT (34) message to the Private Integrated Services Network Exchange PINX, which responds by sending a QSIG RELEASE (35) message to the Gateway GW. The Gateway GW responds by generating a QSIG RELEASE message that is encapsulated in an SIP OK (36) message, which is sent to the Soft Switch SS. The Soft Switch SS responds by generating a QSIG RELEASE COMPLETE message that is encapsulated in an SIP BYE (37) message, which is sent to the Gateway GW. The Gateway GW responds by sending a QSIG RELEASE COMPLETE (38) message to the Private Integrated Services Network Exchange PINX. The Gateway GW also responds by sending a SIP OK (39) message to the Soft Switch SS.

An illustrative message exchange according to yet another embodiment of the present invention will be described now. Referring now to FIG. 8, a QSIG and SIP message exchange is depicted demonstrating a Single Step Call Transfer from the Private Integrated Services Network PISN to the IP Network IPN of FIG. 1. In this example, the Internet Telephone IT(1) places a call to the PISN Telephone PT(1), which transfers the call to the Internet Telephone IT(2).

The depicted message exchange from SIP INVITE (1) to the Media Stream (20) results from the Internet Telephone IT(1) successfully establishing a call with the PISN Telephone PT(1). When a Single Step Call Transfer operation (not shown) is initiated at by the PISN Telephone PT(1), a QSIG FACILITY (21) message, which includes an ssctInitiate invocation, is sent from the Private Integrated Services Network Exchange PINX to the Gateway GW. The Gateway GW responds by sending an SIP REFER (22) message, which includes a Refer-To header that contains a URI identifying the Internet Telephone IT(2), to the Soft Switch SS. The Soft Switch SS generates an SIP INVITE (23) message, which includes a Replaces header that includes an appropriate URI for the Internet Telephone IT(2), and sends it to the Internet Telephone IT(1). The Soft Switch SS sends an SIP ACCEPTED (24) message to the Gateway GW.

The Internet Telephone IT(1), responds to the SIP INVITE (23) message by sending an SIP OK (25) message to the Soft Switch SS, which responds by sending an SIP NOTIFY (26) message to the Gateway GW and an SIP ACK (27) message to the Internet Telephone IT(1). The Gateway GW processes the SIP NOTIFY (26) message and generates a QSIG FACILITY (28) message, which includes an ssctInitiate response, and sends it to the Private Integrated Services Network Exchange PINX. The Gateway GW acknowledges receipt of the SIP NOTIFY (26) message by sending an SIP OK (29) message.

The Internet Telephone IT(1) proceeds to establish a call with the Internet Telephone IT(2) by sending the message exchange depicted from SIP INVITE (30) through SIP ACK (37). The Soft Switch SS responds to the SIP ACK (37) message by generating and sending an SIP NOTIFY (38) message to the Gateway GW. The Soft Switch SS also responds by sending an SIP ACK (39) message to the Internet Telephone IT(2), which results in a Media Stream (40) between to the Internet Telephone IT(1) and the to the Internet Telephone IT(2).

The Gateway GW responds to the SIP NOTIFY (38) message by sending a QSIG DISCONNECT (41) message to the Private Integrated Services Network Exchange PINX. The Private Integrated Services Network Exchange PINX responds to the QSIG DISCONNECT (41) message by sending a QSIG RELEASE (42) message to the Gateway GW. The Gateway GW responds by sending an SIP OK (43) message to the Soft Switch SS, which responds by sending an SIP BYE (44) message from the Gateway GW. The Gateway GW responds by sending a QSIG RELEASE COMPLETE (45) message to the Private Integrated Services Network Exchange PINX and by sending an SIP OK (46) message to the Soft Switch SS.

With reference to FIGS. 9A and 9B, a message exchange according to another embodiment of the present invention is described where a QSIG and SIP message exchange is depicted demonstrating a Single Step Call Transfer from the Private Integrated Services Network PISN to the IP Network IPN of FIG. 1, which uses SIP tunneling of QSIG messages. In this example, the Internet Telephone IT(1) places a call to the PISN Telephone PT(1), the call is answered, the call is placed on hold, and then the call is transferred to the Internet Telephone IT(2).

The depicted message exchange from SIP INVITE (1) through SIP QSIG CONNECT ACK (20) establishes a call between the Internet Telephone IT(1) and the PISN Telephone PT(1). When the PISN Telephone PT(1) attempts to transfer the call to the Internet Telephone IT(2), a QSIG FACILITY (21) message, which includes an ssctInitiate invocation, is sent from the Private Integrated Services Network Exchange PINX to the Gateway GW.

The Gateway GW processes the QSIG FACILITY (21) message and generates a QSIG FACILITY message, which includes the ssctInitiate invocation that is encapsulated in an SIP INFO (22) message, and sends it to the Soft Switch SS. The Soft Switch SS processes the SIP INFO (22) message and generates an SIP INVITE (23) message, which has a URI identifying Internet Telephone IT(2) in a Replaces header, and sends it to the Internet Telephone IT(1). The Soft Switch SS acknowledges receipt of the SIP INFO (22) message by sending an SIP OK (24) message. The Internet Telephone IT(1) acknowledges receipt of the SIP INVITE (23) message by sending an SIP OK (25) message.

When the Soft Switch receives the SIP OK (25) message from Internet Telephone IT(1), it generates a QSIG FACILITY message, which includes an ssctInitiate response, that is encapsulated in an SIP INFO (26) message and sent to the Gateway GW. The Soft Switch SS also sends an SIP ACK (27) message to the Internet Telephone IT(1). The Gateway GW processes the encapsulated FACILITY message and generates a QSIG FACILITY (28) message, which includes the ssctInitiate response, and sends it to the Private Integrated Services Network Exchange PINX. The Gateway also sends an SIP OK (29) message to the Soft Switch SS.

The Internet Telephone IT(1) proceeds to establish a call to the Internet Telephone IT(2) in the depicted message exchange from SIP INVITE (30) through SIP ACK (37). The Soft Switch SS responds to the SIP ACK (37) message by generating a QSIG DISCONNECT message, which is encapsulated in an SIP NOTIFY (38) message and sent to the Gateway GW. The Soft Switch SS also responds to the SIP ACK (37) message by sending an SIP ACK (39) message to the Internet Telephone IT(2), which results in a Media Stream (41) between Internet Telephone IT(1) and Internet Telephone IT(2).

The Gateway GW responds to the SIP NOTIFY (38) message by sending a QSIG DISCONNECT (40) message to the Private Integrated Services Network Exchange PINX, which responds by sending a QSIG RELEASE (42) message to the Gateway GW. In response, the Gateway GW generates an SIP OK (43) message, which contains an encapsulated version of the QSIG RELEASE message, and sends it to the Soft Switch SS. The Soft Switch SS responds by generating a QSIG RELEASE COMPLETE message, which is encapsulated in an SIP BYE (44) message and sent to the Gateway GW. The Gateway GW responds by generating a QSIG RELEASE COMPLETE (45) message that is sent to the Private Integrated Services Network Exchange PINX. The Gateway GW also responds by generating and sending an SIP OK (46) message to the Soft Switch SS. As with the previous examples, Gateway GW and the Private Integrated Services Network Exchange PINX no longer have any resources devoted to the call between the Internet Telephone IT(1) and the Internet Telephone IT(2).

The present invention has been illustrated and described with reference to particular embodiments and applications thereof. It will be readily apparent to those skilled in that art that the present invention will have applications beyond those described herein for purposes of description of the invention. For example, the present invention can be adapted for use in any environment where the resource utilization achieved by implementing the principals taught herein is desired.

To facilitate discussion of the present invention, preferred illustrative embodiments are assumed; however, the above-described embodiments are merely illustrative of the principals of the invention and are not intended to be exclusive embodiments thereof. It should be understood by one skilled in the art that alternative embodiments drawn to variations in the enumerated embodiments and teachings disclosed herein can be derived and implemented to realize the various benefits of the present invention. By way of example, one embodiment of the present invention is a Soft Switch SS that is capable processing and generating messages as shown in the exemplary message exchanges that are depicted in FIGS. 3, 5A, and 5B. Similarly, another embodiment is a Soft Switch SS that is capable processing and generating messages as shown in the exemplary message exchanges that are depicted in FIGS. 2-9B.

It should further be understood that the foregoing and many various modifications, omissions and additions may be devised by one skilled in the art without departing from the spirit and scope of the invention. It is therefore intended that the present invention is not limited to the disclosed embodiments but should be defined in accordance with the claims which follow.

What is claimed is:

1. A method of call completion in a communications network which comprises a soft switch, and a first network and a second network interconnected to each other through an interconnection resource, the method comprising:
   initiating a call from a call originator in said first network to a destination in said second network;
   allocating said interconnection resource;
   routing the call from said first network through said interconnection resource to said second network, said soft switch performing call routing for call destinations in said second network;
   rerouting said call to a call destination within said first network, wherein said soft switch determines that said call is being rerouted to the same network from where it was initiated; and
   releasing said interconnection resource, wherein said soft switch controls said interconnection resource such that said interconnection resource is released prior to completion of said call to said call destination in said first network.

2. The method of claim 1, wherein said first network is an IPN.

3. The method of claim 1, wherein said second network is a QSIG/PISN.

4. The method of claim 1, wherein said interconnection resource is a circuit of a gateway.

5. The method of claim 1, wherein said call destination in said first network is the same as said call originator in said first network.

6. The method of claim 1, wherein said call destination in said first network is different that said call originator in said first network.

7. The method of claim 1, wherein:
said first network is an IPN;
said second network is a QSIG/PISN;
said interconnection resource is a circuit of a gateway; and
said call destination in said first network is the same as said call originator in said first network.

8. The method of claim 7 wherein said call rerouting results from Single Step Call Transfer.

9. The method of claim 7 wherein said call rerouting results from call diversion.

10. The method of claim 1, wherein:
said first network is an IPN;
said second network is a QSIG/PISN;
said interconnection resource is a circuit of a gateway; and
said call destination in said first network is different that said call originator in said first network.

11. The method of claim 10 wherein said call rerouting results from Single Step Call Transfer.

12. The method of claim 10 wherein said call rerouting results from call diversion.

13. A communications network comprising:
a first network including a call originator;
an interconnection resource;
a second network including a call destination, said second network interconnected to said first network through said interconnection resource;
a soft switch that performs call routing for said call destination in said second network;
wherein a call is initiated from said call originator in said first network to a call destination in said second network and said interconnection resource is allocated to route the call from said first network through said interconnection resource to said second network and said call is rerouted to a call destination within said first network and wherein said soft switch determines that said call is being rerouted to the same network from where it was initiated; and
wherein said soft switch controls said interconnection resource such that said interconnection resource is released prior to completion of said call to said destination in said first network.

14. The network of claim 13, wherein said first network is an IPN.

15. The network of claim 13, wherein said second network is a QSIG/PISN.

16. The network of claim 13, wherein said interconnection resource is a circuit of a gateway.

17. The network of claim 13, wherein said call destination in said first network is the same as said call originator in said first network.

18. The network of claim 13, wherein said call destination in said first network is different that said call originator in said first network.

19. The network of claim 13, wherein:
said first network is an IPN;
said second network is a QSIG/PISN;
said interconnection resource is a circuit of a gateway; and
said call destination in said first network is the same as said call originator in said first network.

20. The network of claim 19 wherein said call rerouting results from Single Step Call Transfer.

21. The network of claim 19 wherein said call rerouting results from call diversion.

22. The network of claim 13, wherein:
said first network is an IPN;
said second network is a QSIG/PISN;
said interconnection resource is a circuit of a gateway; and
said call destination in said first network is different than said call originator in said first network.

23. The network of claim 22 wherein said call rerouting results from Single Step Call Transfer.

24. The network of claim 22 wherein said call rerouting results from call diversion.

25. A method of call routing in a communications network which comprises a soft switch, and a first network and a second network interconnected to each other through an interconnection resource, the method comprising:
capturing said interconnection resource to route a call originating in said first network through said interconnection resource to said second network, said soft switch performing call routing for call destinations in said second network;
rerouting said call to a call destination within said first network, wherein said soft switch determines that said call is being rerouted to the same network from where it was initiated; and
releasing said interconnection resource, wherein said soft switch controls said interconnection resource such that said interconnection resource is released prior to completion of said call to said call destination in said first network, 26. A communications network implementing the method of claim 25.

27. The communications network of claim 26 wherein the inter-network resource is a circuit of a gateway.

28. A method of resource allocation in a communications structure which comprises a soft switch, and at least a first network and a second network interconnected to each other through an inter-network resource, the method comprising:
allocating said inter-network resource to perform an inter-network process;
said soft switch determining whether said inter-network process has become an intra-network process to where it was initiated; and
releasing said inter-network resource, wherein said soft switch controls said inter-network resource such that said inter-network process is released after becoming said intra-network process and prior to completion of said intra-network process.

29. The method of claim 28 wherein the inter-network resource is a circuit of a gateway.

30. A communications network implementing the method of claim 28.

31. The communications network of claim 30, wherein the network comprises a soft switch that controls said inter-network resource such that said inter-network resource is released prior to completion of said intra-network process.

32. The communications network of claim 31 wherein the inter-network resource is a circuit of a gateway.

* * * * *